United States Patent
Garcia et al.

(10) Patent No.: US 6,778,990 B2
(45) Date of Patent: Aug. 17, 2004

(54) DYNAMIC COMPONENT ACTIVATION METHOD USING A RELATIONAL DATABASE AS THE REPOSITORY FOR REGISTRATION INFORMATION

(75) Inventors: Julio Cesar Garcia, Ft Collins, CO (US); Joseph R Hunt, Fort Collins, CO (US); Amy O'Keefe-Hyser, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 09/916,545

(22) Filed: Jul. 27, 2001

(65) Prior Publication Data

US 2003/0023599 A1 Jan. 30, 2003

(51) Int. Cl.[7] .............................................. G06F 17/30
(52) U.S. Cl. ............................ 707/10; 707/104; 717/5; 717/6; 717/107; 709/315
(58) Field of Search .................................. 717/107, 108, 717/5, 6; 707/10, 104; 705/59; 709/315, 332

(56) References Cited

U.S. PATENT DOCUMENTS

| | | | |
|---|---|---|---|
| 5,210,840 A | * | 5/1993 | Fukagawa et al. .......... 711/220 |
| 5,295,256 A | | 3/1994 | Bapat ......................... 395/500 |
| 5,504,885 A | | 4/1996 | Alashqur .................... 395/600 |
| 5,659,725 A | | 8/1997 | Levy et al. ................. 395/600 |
| 5,754,855 A | * | 5/1998 | Miller et al. ................ 709/106 |
| 5,802,367 A | * | 9/1998 | Held et al. .................. 709/332 |
| 5,920,718 A | | 7/1999 | Uczekaj et al. |
| 5,943,497 A | | 8/1999 | Bohrer et al. |
| 6,023,578 A | | 2/2000 | Birsan et al. |
| 6,047,284 A | | 4/2000 | Owens et al. ................. 707/4 |
| 6,059,838 A | * | 5/2000 | Fraley et al. ............... 717/108 |
| 6,061,515 A | | 5/2000 | Chang et al. ............... 395/702 |
| 6,085,030 A | * | 7/2000 | Whitehead et al. ......... 709/203 |
| 6,085,198 A | | 7/2000 | Skinner et al. |
| 6,182,278 B1 | * | 1/2001 | Hamada et al. ............ 717/107 |
| 6,199,077 B1 | * | 3/2001 | Inala et al. ............... 715/501.1 |
| 6,263,492 B1 | * | 7/2001 | Fraley et al. ............... 717/107 |
| 6,502,102 B1 | * | 12/2002 | Haswell et al. ............ 707/102 |

FOREIGN PATENT DOCUMENTS

| | | |
|---|---|---|
| EP | 1061446 A2 | 12/2000 |
| GB | 2325539 B | 11/1998 |

* cited by examiner

Primary Examiner—Jean M. Corrielus

(57) ABSTRACT

A method for allowing dynamic component activation using a database as a repository for registration information is disclosed. This method uses a Component Activation Manager (CAM), which is a singleton object that maps unique component ID's to a Factory Creation Function (FCF). A purpose of the FCF is to create and register factories for the objects contained in a dynamic library. The factories created with the FCF are also registered with a database connection created by the CAM. Using this approach, the application only needs to create the CAM object, request a connection and then request a factory for the objects it needs. The CAM and the database connection find the dynamic library and the associated object factories through the use of database tables that contain a map of unique component ID's and object FCF addresses.

15 Claims, 4 Drawing Sheets

DYNAMIC COMPONENT ACTIVATION METHOD USING A RELATIONAL DATABASE AS THE REPOSITORY FOR REGISTRATION INFORMATION

FIELD OF THE INVENTION

The present invention relates generally to object-oriented development of database applications and more specifically to dynamic component activation through the use of a database as a repository for registration information.

BACKGROUND OF THE INVENTION

Prior to this invention, component registration under the Microsoft Windows operating system was achieved with the Service Control Manager (SCM). However, the SCM is very tightly coupled to Microsoft's Component Object Model (COM), and therefore to the windows platform. This mechanism is generally not available in other platforms and must be used in conjunction with COM.

There are other well-known mechanisms that may be used for registering component information. Directory services, naming services, and location brokers can be used for this purpose. However, these services are complex and not easily understood, difficult to manage, and may perform poorly. In addition, these services cannot be used by an application to load functionality dynamically without additional software development.

There is therefore an unmet need in the field for a simple and robust technique for dynamic component activation that operates under multiple operating systems, including Microsoft Windows NT™ and Unix. A useful dynamic component activation method should be transparent to the calling application, only requiring that the application have knowledge of the name or unique identifier for the objects that need to be loaded. The details of how the dynamic libraries are loaded and the components activated should preferably scale across a distributed and heterogeneous computing environment.

BRIEF SUMMARY OF THE INVENTION

Therefore, in accordance with an embodiment of the present invention, a method for dynamic component activation using one or more databases as a repository for registration information in an application in a heterogeneous and distributed computing environment is disclosed. This method comprises launching the application, creating and initializing a Component Activation Manager (CAM), opening a database connection using the CAM, requesting functionality not currently available in the application using the database connection; using the CAM and the database connection to find and return the requested functionality, which may be encapsulated in an object factory, and loading the requested functionality to extend the application. The CAM, which may be contained in one or more dynamic libraries, is preferably created and initialized when the application is launched.

Using the CAM and the database connection to find and return the requested object factory may further comprise the database connection object looking up the requested object factory in the connection table, the database connection object returning the requested object factory if it is in the connection table, the database connection object sending a message to the CAM to obtain a factory creation factor (FCF) for the requested object if said requested object factory is not in the connection table, and, if requested factory object is not associated with the current database connection, the database connection object sending a message to the dynamic library to create an instance of the object factory using the FCF and receiving the instance of the object factory. The FCF creates images of the objects of the connection table in memory which may then be used as a factory of the objects.

A structure for dynamic component activation using databases as the repository for registration information in an application in a heterogeneous computing environment is also disclosed. The application is coupled to objects that provide the functionality for dynamic component activation. One or more database connection objects are coupled to one or more local databases, one or more remote databases, and the application. The structure further includes a Component Activation Manager (CAM) that is coupled to the one or more database connection objects, dynamic libraries that are coupled to the one or more local databases and the one or more remote databases, factory creation objects, and class objects coupled to the application via the database connection objects. The factory creation objects are contained in the dynamic libraries and are coupled to the CAM via the database connection objects. The class objects are created through the use of the factory creation objects and the dynamic libraries.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

Figure 1:
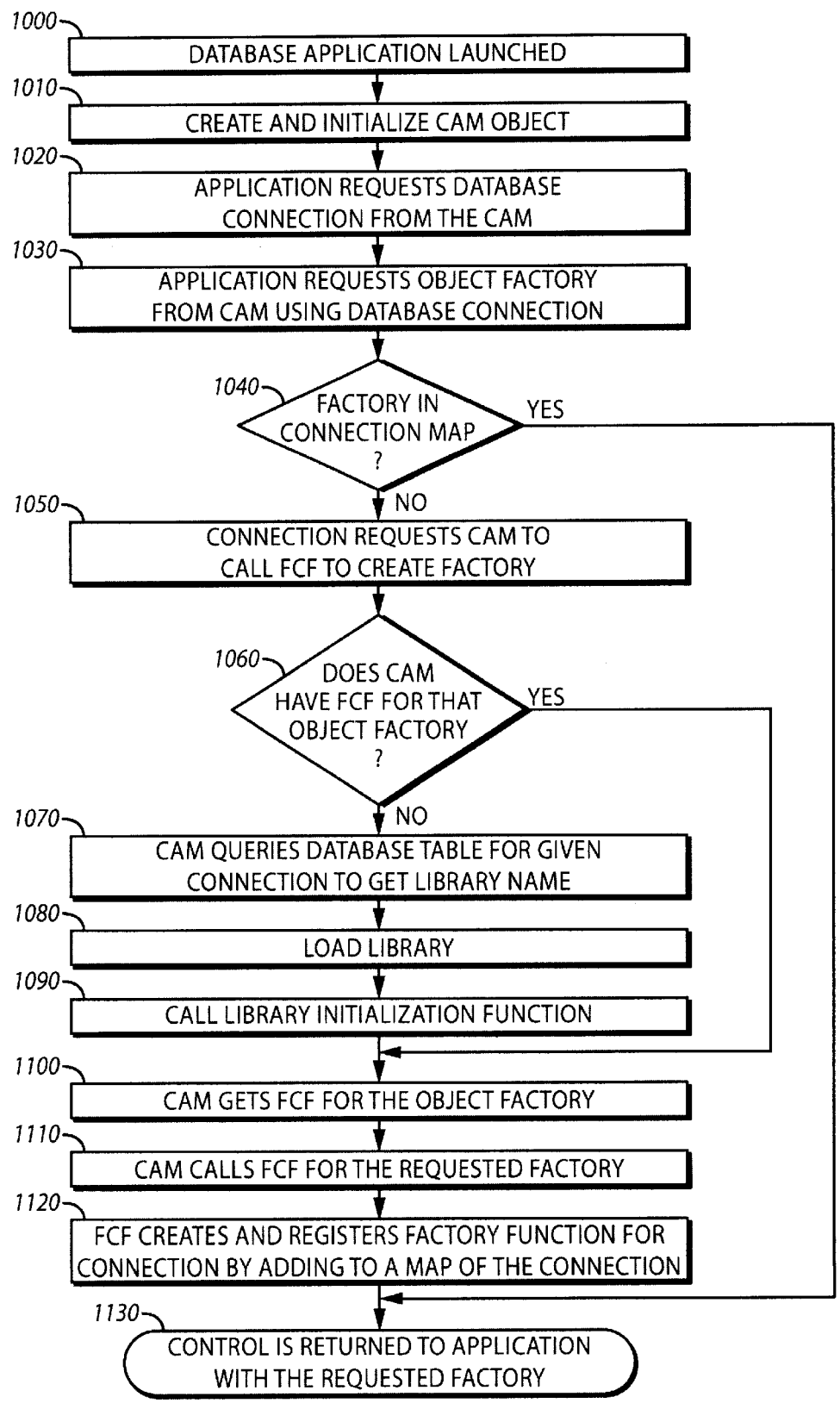
FIG. 1 shows the process used when loading a dynamic library, according to an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present invention discloses a method and structure for dynamic component activation using one or more databases as a repository for registration information for a distributed application in a heterogeneous computing environment. According to this approach, an application may load one or more dynamic libraries dynamically to extend program functionality.

Therefore, in according to one embodiment of the method and structure of the present invention, dynamic component activation using a database as the repository for registration information can be achieved. Dynamic component activation, or the ability to dynamically expand the functionality of an application program while the program is executing, allows application developers to create software that is extensible while running in a heterogeneous and distributed environment. The present invention uses object-oriented concepts in order to execute the dynamic component activation strategy contained in the method of the present invention. An object is a collection of methods and their associated data. The data is accessed by other objects through the use of the object methods. Object oriented development and design is a methodology that utilizes the structure of an object in addition to other programming concepts to design software applications that are reusable and more easily understood than traditional programming languages such as C. Two object oriented concepts used in one embodiment of the present invention are object factories and shared or dynamic libraries. Object factories are used to create instances of a specified object, while the dynamic libraries contain the specific functionality used to extend the application.

Much of the functionality of the invention is provided by a Component Activation Manager (CAM). The CAM is a singleton object that maps unique component ID's to a Factory Creation Function (FCF) in a dynamic library. A purpose of the FCF is to create factories and register them with a database connection. The CAM also functions as a database connection factory. When a FCF creates a factory, the factory is registered with a database connection. Each database in the environment that functions as a registry contains a table that maps class ID's to the file name of a dynamic library that implements that corresponding factory. Given a connection to a database, the connection itself functions as a factory for object factories. The connection maintains a map of class ID's to object factories.

When the application is launched, the CAM object is created and initialized. The application then requests a database connection from the CAM object.

The CAM object and a database object associated with the connection can then be used to enable the application to request an object factory from the connection.

When the application needs to extend functionality during run-time operation, the method of dynamic component activation is used. This process starts when the application requests an object factory from the database connection. The object factory can be used to create the objects that provide the additional functionality. The database connection object receives this request and checks in a local lookup table containing a map between object ID's and the Factory Creation Functions (FCF)s. If the FCF for the object is not in the lookup table, then the corresponding object factory needs to be created. The database connection object then sends a request to the CAM object to call the FCF to create the object factory. If the CAM object does not have the FCF for that object factory, then it loads the dynamic library and calls the library initialization function that registers all FCF's in that library. The CAM object determines the name of the dynamic library that should be loaded by querying the table in the database for the given connection. This table maps object ID's to library file names. Once the CAM object has loaded the library and has the FCF for that object factory it calls the FCF for the requested factory. The FCF then creates and registers the factory with the database connection by adding it to the factory table of the connection. Control is now returned to the database application with the object factory that was requested.

Referring now to FIG. 1, the process involved when extending program functionality, in accordance with the present invention, is shown. After launching a database application at Block 1000, a CAM object, further described below, is created and initialized at Block 1010. The database application then requests a database connection from the CAM at Block 1020. Once the database connection has been established, the application can request an object factory at Block 1030 from the CAM using the database connection. When the CAM receives this request for an object factory, the CAM first checks it's local connection map to determine whether the requested object is available at Decision Block 1040. If the requested object is available, control is returned to the application with the requested object factory at Block 1130.

If, however, the requested object is not available as determined at Decision Block 1040, a database connection object associated with the database connection sends a message (block 1050) to the CAM to call a Factory Creation Function (FCF) to create the requested factory. When the CAM receives this message, it first determines whether it has the FCF for the requested factory. If the CAM does have the FCF for the requested factory as determined at Decision Block 1060, the CAM obtains the FCF for the requested object factory 1100 and then calls the FCF for the requested factory 1110. The FCF creates and registers the factory object for the current database connection by adding an entry in the database connection table 1120. The database connection table contains a map between a plurality of class object identifiers and a plurality of addresses of a plurality of Factory Creation Functions (FCF)s. Control is then returned to the application with the requested factory 1130.

If the CAM does not have the FCF for the requested factory 1060, it first queries the database table for the given database connection to obtain the library name 1070 associated with the requested factory. After receiving the library name associated with the requested factory, the CAM loads the dynamic library 1080 and calls the library initialization function 1090. The library initialization function registers all FCF's contained in the dynamic library. The CAM obtains the FCF for the requested object factory 1100 and then calls the FCF for the requested factory 1110. The FCF creates and registers the factory object for the current database connection by adding an entry in the database connection factory table 1120. The database connection table contains a map between a plurality of class object identifiers and a plurality of addresses of a plurality of Factory Creation Functions (FCF)s. Control is then returned to the application with the requested factory 1130.

Figure 2:
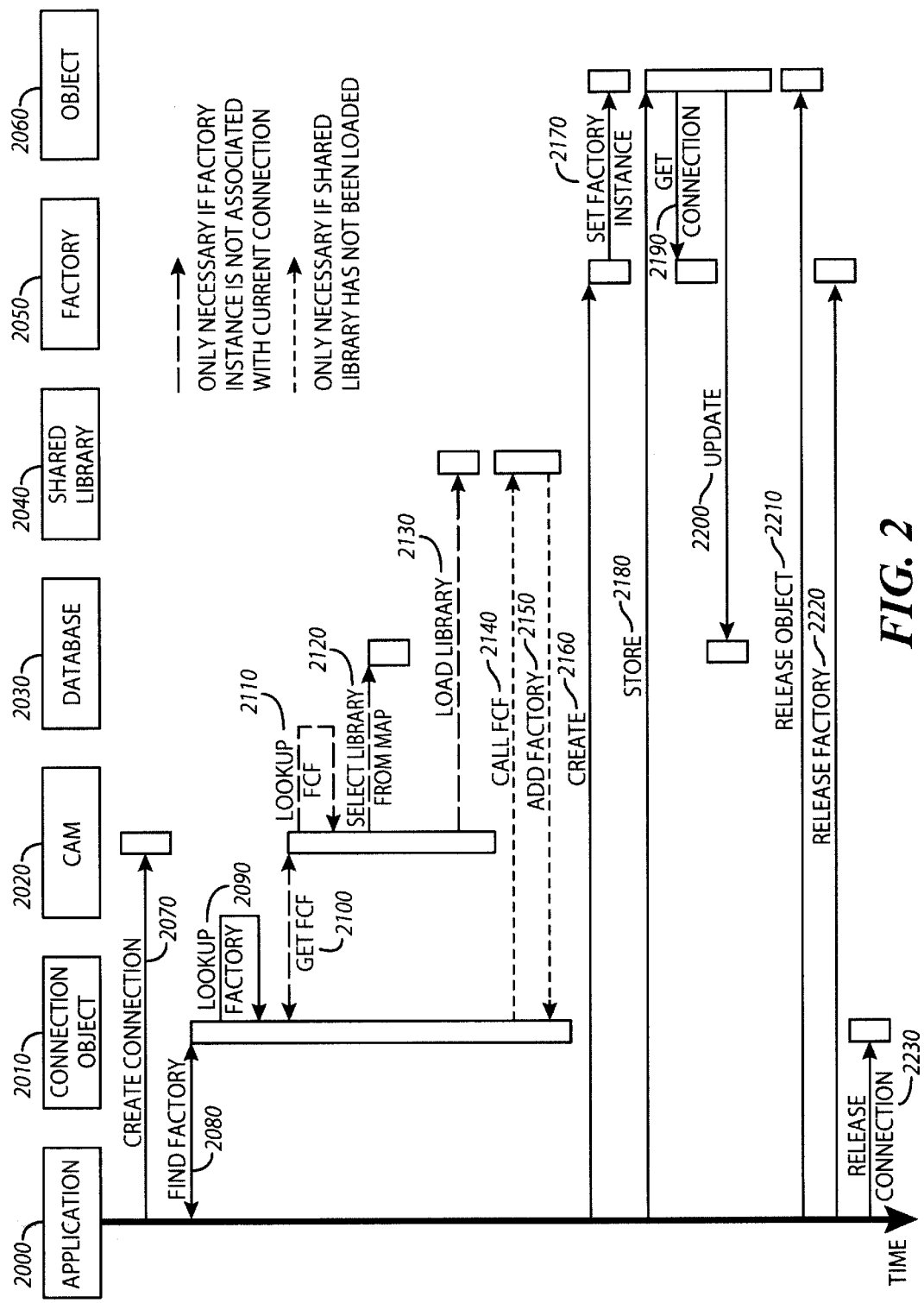
FIG. 2 shows a time-line of the object interactions that allow an application to load a dynamic library, according to an embodiment of the present invention.

The process described in FIG. 1 introduces a number of objects that interact to enable the application to dynamically load libraries. Referring now to FIG. 2, a time-line illustrating the message passing between application 2000, database 2030, dynamic library 2040, and objects comprising the invention, in accordance with one embodiment of the present invention, is shown. After launching the application 2000, a message 2070 is sent from application 2000 to CAM object 2020 to create a connection to database 2030. CAM object 2020 establishes this connection, creating the database connection object 2010. Next, application 2000 sends a message 2080 to database connection object 2010 to find the object factory 2050 associated with a requested object 2060 in dynamic library 2040. Connection object 2010 executes a table lookup 2090, using a lookup table containing a mapping between object ID's and addresses of factory objects, to determine whether the object factory 2050 is associated with the current database connection object 2010. If the factory lookup operation 2090 contains the object factory 2050, then the factory object 2050 is returned to application 2000. Application 2000 can create an object instance 2060 using by sending message 2160 to object factory 2050. Object factory 2050 then creates an instance of requested object 2060.

If factory lookup 2090 does not contain object factory 2050, then a message 2100 is sent to CAM object 2020 instructing it to get the FCF for factory 2050 contained in library 2040. CAM object 2020 performs a look-up 2110 in a table mapping library names to factories, selects the appropriate library 2040 from the table, and loads library 2130. After loading the appropriate library 2040, the FCF is called 2140 to obtain the object factory.

Once database connection object 2010 has object factory 2050, Dynamic library 2040 adds the factory object 2050 to the database connection 2010 with message 2150. The requested object factory 2050 is returned to application 2000. Application 2000 sends a message 2160 directly to object factory 2050 to create an instance of the requested object 2060. Object factory 2050 creates an instance of object 2060 and sends a message 2170 to associate the requested object 2060 to the database connection 2010. Application 2000 is now able to use the requested object 2060. Application 2000 causes the object 2060 to store itself in the database 2030 by sending message 2180. Requested object 2060 gets a handle 2190 to database connection object 2010 and sends a message 2200 directly to database 2030 to update the object storage.

When application 2000 is done using requested object 2060, a release object message 2210 is sent from application 2000 to requested object 2060. Application 2000 then sends a release message 2220 to the object factory 2050 associated with the requested object 2060. Finally, application 2000 sends a message 2230 to database connection object 2010 to release the resources associated with the connection.

Figure 3:
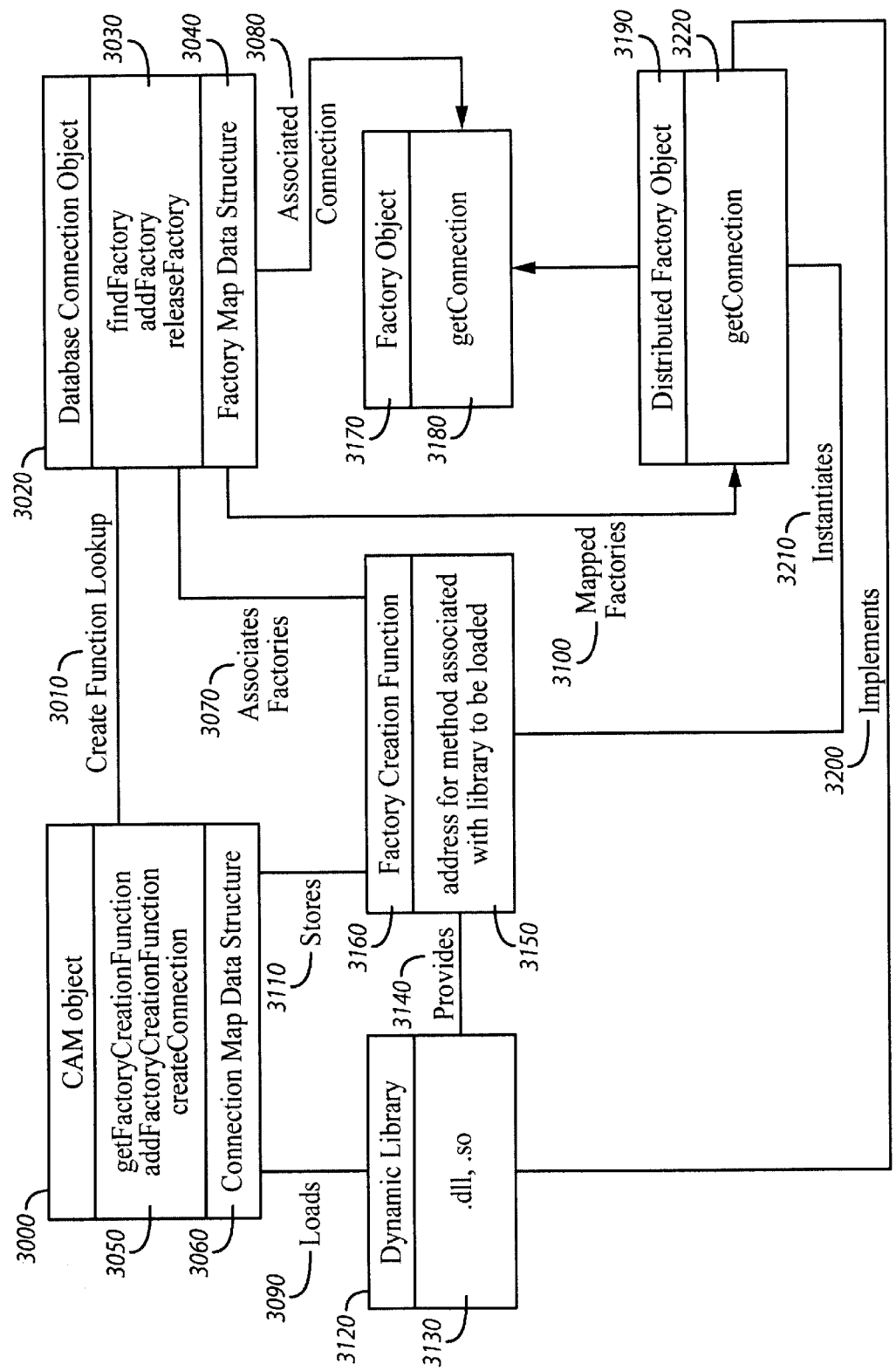
FIG. 3 shows the relationship between the objects used when loading a dynamic library, according to an embodiment of the present invention.

Referring now to FIG. 3, the interactions between the objects and functions used when loading a dynamic library, in accordance with one embodiment of the present invention, is shown. CAM object 3000 contains methods 3050 getFactoryCreationFunction, addFactoryCreationFunction, and createConnection. CAM object 3000 also contains a map data structure 3060 that encapsulates the mapping between a FCF 3160 and object IDs. Database connection object 3020 contains methods findFactory, addFactory, and releaseFactory. Database connection object 3020 also contains a data structure 3040 mapping object ID's to addresses of factories. This data structure is the same data structure accessed by the table lookup operation 2090 of FIG. 2. Database connection object 3020 has a message 3010 connection to CAM object 3000 that is used to locate an object's factory creation function 3160. Factory object 3170 contains a getConnection method 3180. Note that in a realization with more than one type of factory object, factory object 3170 and distributed factory object 3190 with a getConnection method 3220 could be a part of the same application. Both Factory object 3170 and distributed factory object 3190 serve as implementations for the factories contained in dynamic library 3120. The factory objects that are implemented by factory object 3170 and distributed factory object 3190 are stored in the factory map data structure 3040. The factory map data structure 3040 is updated by the factory creation function 3160 using messages 3070 between the factory creation function 3160 and the database connection object 3020. The CAM object 3000 loads 3090 the dynamic library 3120 when required. Dynamic library 3120 may be a dynamic linked library (dll), a shared library (so), or any other applicable dynamic library.

The Factory Creation Function 3160 also interacts with dynamic library 3120 wherein the dynamic library 3120 provides 3140 the factory creation function 3160. The Factory Creation Function 3160 represents the address 3150 of the method in Dynamic Library 3120 that creates and associates factory instances 3070 with database connection object 3020.

Figure 4:
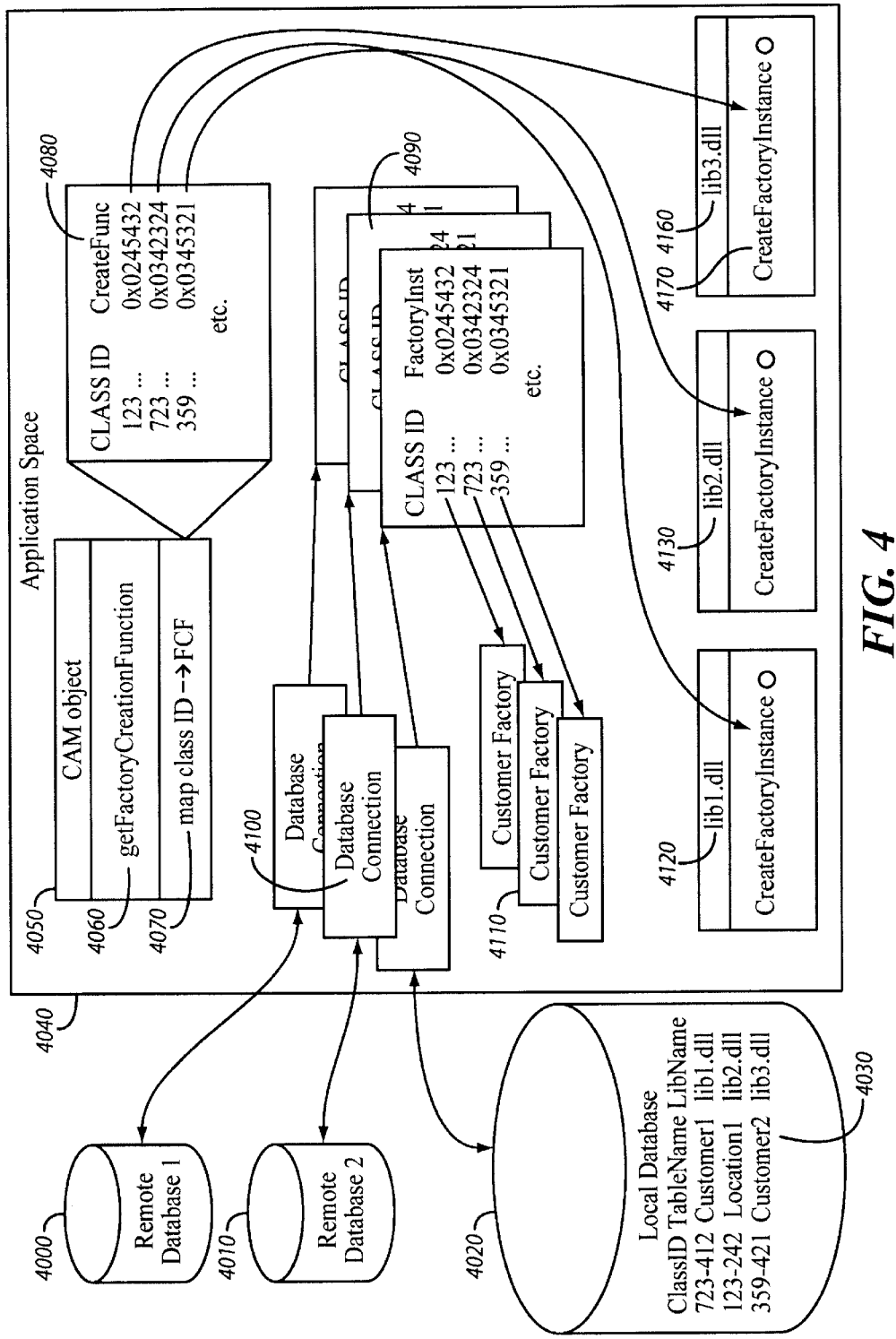
FIG. 4 shows an example of using local and remote relational databases to store registration information, according to an embodiment of the present invention.

Referring now to FIG. 4, an embodiment of the present invention that illustrates the usage of remote and local databases to store registration information is shown. An application 4040 is attached to three databases. One database 4020 is a local database coupled to application 4040, and a second database 4000 and a third database 4010 are remotely coupled to the application 4040. Application 4040 preferably comprises a CAM object 4050, three database connection objects 4100, three object factories 4110, a dynamic library lib1.dll 4120, a dynamic library lib2.dll 4130, and a dynamic library lib3.dll 4160; the use of ".dll" indicates a dynamic linked library but one will understand that any dynamic library may be used. Each of the three database connection objects 4100 contain a data structure 3040 mapping factory ID's to the address of a factory instance. In addition, the CAM object 4050 contains a structure 4070 that maps a class ID of an object to a Factory Creation Function (FCF). This mapping is represented in tabular form 4080.

Each of the three database connection objects 4100 are coupled to one of the three databases (4020, 4000 and 4010). In the embodiment of FIG. 4, the local database 4020 contains a table 4030 that maps the object class ID to the name of the dynamic library containing the object's class. This local database 4020 table 4030 is accessible by the CAM object 4050 through one of the database connection objects 4100. The CAM object uses the connectivity of the database connection objects 4100 to keep the table 4080 contained in structure 4070 updated with the object class ID's and FCF instances that are in use by the application 4040.

Referring again to FIG. 4, the FCF instances loaded into table 4080 of structure 4070 are coupled to the three loaded dynamic libraries (4120, 4130, and 4160). Each of the dynamic libraries (4120, 4130, and 4160) contains a factory creation function(FCF) 4170 to create instances of the object factories 4110 present in each dynamic library. The three object factories 4110 loaded by application 4040 are coupled to the three tables 3040 contained in the three database connection objects 4100. When application 4040 adds functionality contained in a dynamic library, three tables 3040 coupled to database connection objects 4100 are first checked to determine if the needed objects are already created. If the required objects need to be loaded, then table 4080 contained in structure 4070 of CAM object 4050 is checked to determine if the address of the factory creation functions necessary to create the required factories are present. If factory creation functions are present, then createFactoryInstance 4170 methods associated with the required objects are called to create the needed factory instance 4110. Otherwise, database connection objects 4100 interact with the one local 4020 and two remote (4000, 4010) databases to obtain the dynamic libraries which need to be loaded.

It is noted that the database elements may be Microsoft® ODBC™, Oracle™, Sybase™, or any database element that has similar operating characteristics.

While the invention has been particularly shown and described with reference to a preferred embodiment, it will be understood by those skilled in the art that various changes in form and detail may be made therein without departing from the spirit and scope of the invention. For example, one of ordinary skill in the art will recognize that dynamic libraries may refer to dynamic linked libraries in the Microsoft® operating system or shared libraries in the Unix operating system, without departing from the spirit and scope of the invention.

What is claimed is:

1. A method for dynamic component activation using one or more databases as a repository for registration information in an application in a heterogeneous and distributed computing environment, comprising:

launching the application;

creating and initializing a Component Activation Manager;

opening a database connection using the Component Activation Manager;

using the database connection to request a functionality that is encapsulated in an object factory;

using the Component Activation Manager and the database connection to find and return the requested functionality; and loading the requested functionality to extend the application, wherein opening the database connection using the Component Activation Manager further comprises a database connection object, said database connection object containing a connection table, mapping a plurality of object identifiers to a plurality of factories for the database connection object, and wherein using the Component Activation Manager and the database connection to find and return the requested object factory, further comprises:

the database connection object looking up the requested object factory in the connection table;

the database connection object returning the requested object factory if said requested object factory is in the connection table;

the database connection object sending a message to the Component Activation Manager to obtain a Function Creation Factory for the requested object if said requested object factory is not in the connection table;

if requested factory object is not associated with the current database connection, the database connection object sending a message to the dynamic library to create an instance of the object factory using the Function Creation Factory; and if requested factory object is not associated with the current database connection, the database connection object receiving the instance of the object factory.

2. The method of claim 1, wherein creating and initializing the Component Activation Manager occurs during launching of the distributed and heterogeneous application.

3. The method of claim 2, wherein the Component Activation Manager is contained in one or more dynamic libraries.

4. The method of claim 1, wherein the heterogeneous and distributed application resides in a Microsoft Windows NT® operating system.

5. The method of claim 1, wherein the heterogeneous and distributed application resides in a Unix operating system.

6. The method of claim 1, wherein the heterogeneous and distributed application contains a plurality of elements using a Microsoft Windows NT ® operating system, and a plurality of elements using a Unix operating system.

7. The method of claim 1, wherein the one or more databases may be remote databases.

8. The method of claim 1, wherein the one or more databases may be relational databases.

9. The method of claim 1, wherein each object identifier of the plurality of object identifiers are unique.

10. The method of claim 1, wherein the plurality of object identifiers is a plurality of class identifiers (ID)'s in an object-oriented environment.

11. The method of claim 1, wherein the Factory Creation Function creates a plurality of images in memory of the plurality of objects referred to in the connection table, said plurality of images then being used as a factory for the plurality of objects.

12. The method of claim 11, wherein the message between the database connection object and the Component Activation Manager contains a class ID of the requested factory object.

13. The method of claim 1, the database connection object sending a message to the Component Activation Manager to obtain the Factory Creation Function for the requested object if said requested object factory is not in the connection table, further comprising:

the Component Activation Manager CAM determining whether it has the Factory Creation Function for the requested object;

if the Component Activation Manager does not have the Factory Creation Function for the requested object, the Component Activation Manager querying the database for the current connection to obtain the dynamic library corresponding to the class ID;

if the Component Activation Manager does not have the Factory Creation Function for the requested object, the Component Activation Manager sending a message to the dynamic library to load the library and obtain the Factory Creation Function; and the Component Activation Manager returning the Factory Creation Function to the database connection object.

14. The method of claim 13, wherein the Component Activation Manager determining whether it has the Factory Creation Function for the requested object, further comprises looking in a table that maps a plurality of class ID's to a plurality of Factory Creation Function addresses.

15. A method for dynamic component activation using one or more databases as the repository for registration information in a heterogeneous and distributed application, comprising:

(a) launching the application;

(b) creating and initializing a Component Activation Manager object;

(c) creating and initializing a database connection object;

(d) the application opening a database connection using the Component Activation Manager object;

(e) the application requesting an object factory using the database connection object;

(f) the database connection object looking up the requested object factory in the connection table (g) the database connection object returning the requested object factory if said requested object factory is in the connection table;

(h) if said requested object factory is not in the connection table then:

the Component Activation Manager determining whether it has the Factory Creation Function for the requested object;

if the Component Activation Manager does not have the Factory Creation Function for the requested object, the Component Activation Manager querying the database for the current connection to obtain the dynamic library corresponding to the class ID and the Component Activation Manager sending a message to the dynamic library to load the library and obtain the Factory Creation Function; and the Component Activation Manager returning the Factory Creation Function to the database connection object; and (i) if requested factory object is not associated with the current database connection:

the database connection object sending a message to the dynamic library to create an instance of the object factory using the Factory Creation Function;

the database connection object receiving the instance of the object factory; and loading the requested object factory to extend the functionality of the application.

* * * * *